United States Patent [19]

Kittel

[11] 4,348,769
[45] Sep. 7, 1982

[54] CIRCUITRY FOR EXTRACTION OF A TRANSMISSION CLOCK SIGNAL FROM-MODULATED DATA TRANSMISSIONS

[75] Inventor: Ludwig Kittel, Heroldsberg, Fed. Rep. of Germany

[73] Assignee: TE KA DE Felten & Guilleaume Fernmeldeanlagen GmbH, Nuremberg, Fed. Rep. of Germany

[21] Appl. No.: 122,688

[22] Filed: Feb. 19, 1980

[30] Foreign Application Priority Data

Feb. 22, 1979 [DE] Fed. Rep. of Germany ....... 2906886

[51] Int. Cl.³ ............................................. H03K 13/22
[52] U.S. Cl. .................................. 375/28; 332/11 D; 340/347 AD
[58] Field of Search ...................... 375/23, 25, 26, 106, 375/107, 108, 118, 119, 89, 27–33; 329/50, 100; 328/63; 455/109, 326; 370/100–102; 358/135, 136; 332/11 D, 11

[56] References Cited

U.S. PATENT DOCUMENTS

| 2,803,702 | 8/1957 | Ville | 375/28 |
| 3,550,082 | 12/1970 | Tong | 371/42 |
| 3,588,364 | 6/1971 | Wallingford | 375/28 |
| 3,619,662 | 11/1971 | Vachon | 375/119 |
| 3,806,806 | 4/1974 | Brolin | 332/11 D |
| 4,010,323 | 3/1977 | Peck | 375/118 |
| 4,027,266 | 5/1977 | Clark | 375/89 |
| 4,087,754 | 5/1978 | Song | 375/94 |
| 4,122,300 | 10/1978 | Busigny | 375/28 |
| 4,215,311 | 7/1980 | Kittel et al. | 375/30 |

FOREIGN PATENT DOCUMENTS 2040617  8/1980  United Kingdom ............. 332/11 D

Primary Examiner—Benedict V. Safourek
Assistant Examiner—Stephen Chin
Attorney, Agent, or Firm—Michael J. Striker

[57] ABSTRACT

A system is disclosed in which a modulated transmission is itself delta-modulated, in order to derive a transmission clock signal characteristic of the transmission, as opposed to being characteristic of an underlying data signal which is used as a modulating waveform in the transmission. The delta-modulation detects changes in state of the data transmission, which changes in state can be monitored in order to derive the transmission clock signal utilized. In a preferred embodiment, a phase-locked loop may be utilized to produce a pulse train having the same frequency as, and being in phase with, such changes of state in the transmission.

5 Claims, 2 Drawing Figures

CIRCUITRY FOR EXTRACTION OF A TRANSMISSION CLOCK SIGNAL FROM-MODULATED DATA TRANSMISSIONS

BACKGROUND OF THE INVENTION

1. Field of the Invention

This invention pertains to circuitry which can be used to extract a transmission clock signal from isochronous modulated transmissions (hereinafter this line-signal is referred to as data transmissions) in order to facilitate subsequent use of the data contained in such transmissions.

2. Description of the Prior Art

Because of the increased amount of information which can be transmitted through telephone data lines, it is now common practice to modulate a carrier in order to transmit such information within a telephone network. In such applications, use is commonly made of modems, which are modulator-demodulator circuits. When such apparatus is used, information actually transmitted through the telephone network is transmitted in modulated data transmissions wherein the modulating waveform is a binary square-wave data signal.

Various conversion techniques may be utilized by such modems. For transmission rates of less than 1200 bits per second, methods using frequency-shift keying are commonly employed. In modulation techniques of this kind, a negative condition in the underlying data signal is assigned a symbol of 1300 Hz in the modulated data transmission, and a positive condition is correspondingly assigned a symbol of 2100 Hz. In such a system, only two different symbols are utilized to transmit the information.

However, when transmission speeds of greater than 1200 bits per second in the modulated data transmission are employed, it is necessary to utilize more than two symbols in order to achieve acceptable data accuracy at such high data transmission speeds. In general, the number M of symbols will be equal to $2^N$, wherein N is the number of bits. In fact, if the rate R of transmission speed is considered, it will appear that R will be equal to N multiplied by $F_T$, wherein $F_T$ is equal to the frequency of the transmission clock of the data transmission.

For such transmission speeds in excess of 1200 bits per second, differential phase-shift keying (hereinafter referred to as DPSK) techniques are used in order to modulate a carrier with the underlying data signal. In DPSK techniques, the phase of the carrier is sampled in phase with the clock frequency $F_T$ of the modulated data transmission, and each difference in phase between two adjacent sample points constitutes the symbol for data present in the carrier.

Many reasons exist why the extraction of a clock signal from a data transmission is desirable. Firstly, it is helpful to have this transmission clock signal available at a receiving station in order to utilize it to demodulate the modulated data transmission. Secondly, data-processing equipment may be present at the receiving end of a telephone system, as in the case of a computer which is connected to a remote terminal by means of a telephone line. In cases such as this one, it is advantageous to derive the speed (or frequency) with which data is actually transmitted. As mentioned above, this speed can be determined in the event that the number of bits utilized in the DPSK system and the clock frequency of the data transmissions are known.

Those skilled in the art are aware that various techniques are available in order to derive the frequency of the clock signal of the underlying data signal from the frequency of the transmission clock signal of the modulated data transmission. For example, it is possible to utilize frequency multiplication under the influence of phase-controlled attenuation to do this. The main difficulty with using techniques of this type is the original extraction of the transmission clock signal from the PCM data transmission itself.

In a publication entitled "Ein Vorschlag zur Taktsynchronisation bei Datenübertragung" by Joachim Swoboda, Archiv der Elektrischen Übertragung, Volume 22, Part 11 (November 1968) pp. 509–513, methods of recovery of the clock signal of an underlying data signal from the changes in state of that signal are described. These changes in state occur at spacings of one clock pulse of the data signal or at spacings of an integral multiple of the duration of one such clock pulse. Hence, such changes in state can be used to readjust the frequency of an oscillator in a phase-controlled circuit in a receiver that receives the signal. The frequency of this oscillator may be adjusted either continuously or in steps, the latter alternative being accomplished by means of a switchable frequency divider.

However, such a system has the disadvantage that the clock signal of the modulating data signal which is impressed upon the modulated data transmission cannot be obtained directly from the carrier. Rather, a complicated demodulating circuit must be used. However, it is also difficult to demodulate the modulated data transmission with the aid of its own transmission clock signal if this transmission clock signal must first be obtained from the underlying data signal which is produced at the demodulator output.

It would therefore be advantageous to provide a circuit which would enable a transmission clock signal to be simply and directly extracted from the data transmission itself, without the intermediary of a complicated demodulator.

SUMMARY OF THE INVENTION

This object, and others which will appear hereinafter, is achieved by utilizing that property of transmissions which was noted above—the property that the transmission clock pulse of a modulated data transmission appears periodically in the signal as a high rate of change in signal state. In this invention, changes in state of the data transmission are picked up in a discriminating stage which responds to such changes in state of the data transmission and produces a binary output signal having the periodicity of such changes and being in phase therewith. This periodic output signal is processed in an interpreting stage which utilizes such periodicity to produce a pulse train with the same frequency and phase as the transmission clock pulse of the modulated data transmission.

In the discriminating stage, the incoming data transmission is subjected to delta-modulation not for the purpose of demodulating the transmission, but rather for the purpose of identifying its rate of change of state. As a result of this delta-modulation, an automatic digitization of such rate of change occurs. Then, the output signal (which is in digital form) can be processed in order to eliminate irrelevant components which are not related to changes in state of the data transmission.

In order to extract a transmission clock signal suitable for use in subsequent processing, the interpreting stage may contain a phase-locked loop which tracks the periodicity of the output signal exactly, enabling a train of square-wave pulses to be produced with precisely the correct frequency and phase.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF PREFERRED EMBODIMENTS

Figure 1:
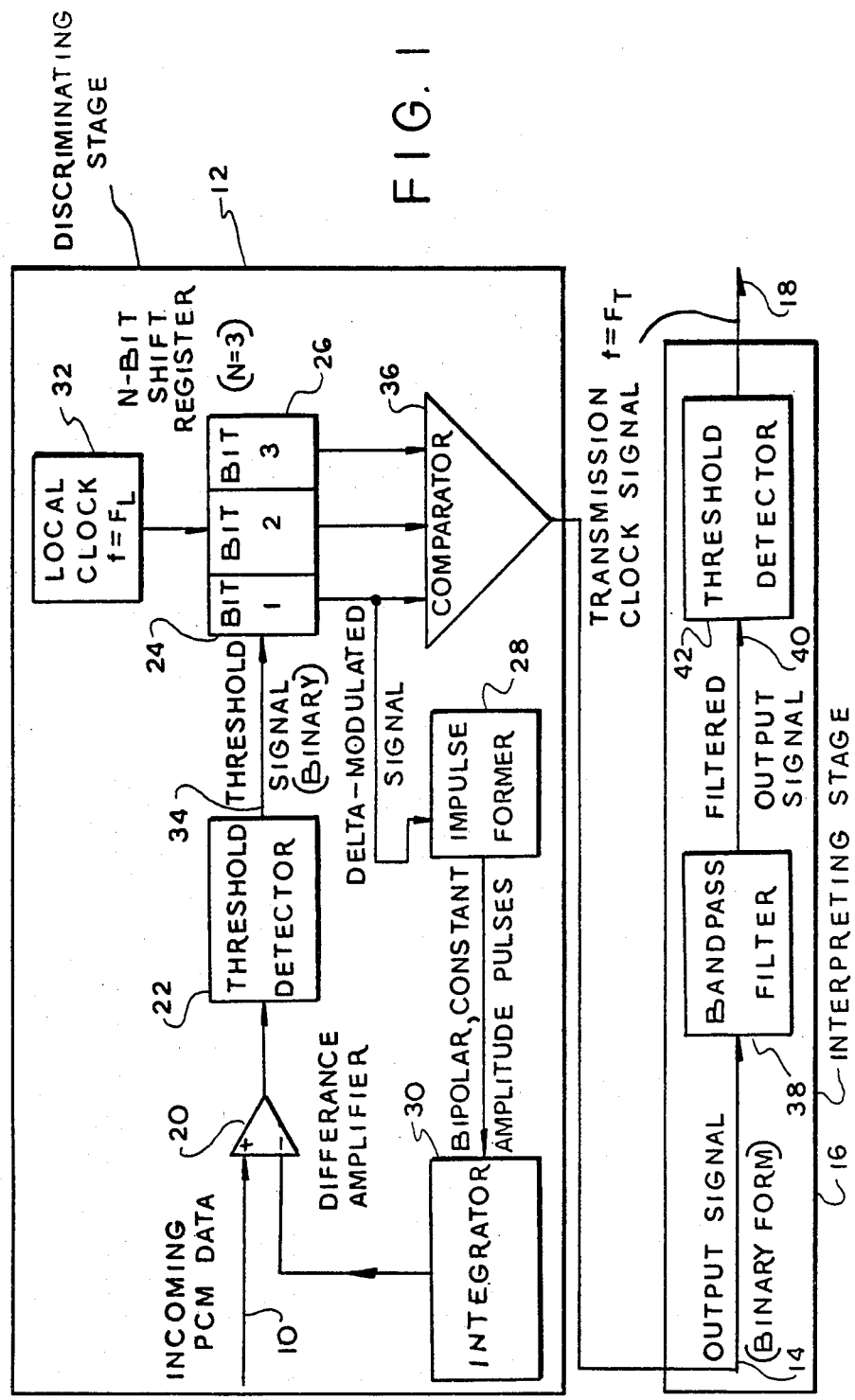
FIG. 1 is a block diagram of a first embodiment of the invention.

Referring first to FIG. 1, a DPSK data transmission 10 is introduced into a discriminating stage 12. Discriminating stage 12 produces an output signal 14 in binary form which is routed to an interpreting stage 16. Interpreting stage 16 produces a transmission clock signal 18 which is characteristic of the modulated data transmission 10 itself, without an intervening demodulation.

In order to cause the system to respond to changes in state of data transmission 10 (which, as mentioned above, occurs periodically therein), data transmission 10 is subjected to delta-modulation by means of a loop which includes a difference amplifier 20, a threshold detector 22, the first bit cell 24 of 3 bit shift register 26, an impulse former 28, and an integrator 30. Shift register 26 is clocked by a local clock 32 which operates at a high frequency.

Threshold detector 22, which may be a Schmitt trigger or the like, produces a binary threshold signal 34 which is logically high when the output of difference amplifier 20 is greater than 0, threshold signal 34 being logically low when the output of difference amplifier 20 is negative. The logically high and logically low threshold signals 34 produced by threshold detector 22 are registered in first bit cell 24 of shift register 26 every time that a pulse generated by local clock 32 is received by shift register 26. These logically high and logically low signals are routed to impulse former 28, which produce pulses which are of constant amplitude, but which are positive when a logically high signal is routed to impulse former 28 and are negative when a logically low signal is routed to impulse former 28. The bipolar pulses of constant amplitude thus produced by impulse former 28 are then subjected to time-integration in integrator 30, and the integrated signals representing these bipolar pulses are routed to the inverting input of difference amplifier 20.

Thus, it can be seen that when data transmission 10 is greater than the signal appearing at the inverting input of difference amplifier 20, a logically high threshold signal 34 will be produced, while when data transmission 10 is less than this signal, threshold signal 34 will be logically low. Thus, by delta-modulating data transmission 10, changes in state of data transmission 10 can be detected by examination of the contents of shift register 26 via slope-overload detection of the delta-modulator.

Local clock 32 operates with a frequency $F_L$ which is much greater than the transmission clock signal which characterizes data transmission 10. Thus, the delta-modulation performed in the above-described loop is extremely accurate. Since the transmission clock signal of data transmission 10 is periodic, there will be periods of congruence and non-congruence within the bit cells of shift register 26 as data transmission 10 is delta-modulated. The periodicity of data transmission 10 will be reflected in congruence of the contents of the bit cells in shift register 26, so that when the contents of all the bit cells in shift register 26 are identical, a change in state of data transmission 10 will have been detected.

Thus, a comparator 36 is connected to each of the bit cells in shift register 26. When the contents of all the bit cells are identical, comparator 36 produces a logically high output signal 14, and produces a logically low output signal 14 when any non-congruence between the contents of the bit cells in shift register 26 exists. The binary output signal 14 thus produced will have a periodic character which is equal in frequency to, and in phase with, the transmission clock signal contained in data transmission 10.

At this point, it is appropriate to note that the delta-modulation performed by difference amplifier 20, threshold detector 22, first bit cell 24 of shift register 26, impulse former 28, and integrator 30 is known per se. However, this delta-modulation technique is here utilized in an entirely novel fashion. Delta-modulation is normally utilized in order to encode incoming analog information in order to convert that information into digital form, for subsequent transmission and decoding at the receiving end of a data-transmission system. However, in the case at hand, delta-modulation is utilized not to encode data transmission 10, but rather to enable it to be examined for changes in state and thus to enable its transmission clock signal to be derived. It would be possible, for example, to utilize adaptive delta-modulation in which output signal 14 was integrated, rectified and smoothed in order to generate a control voltage which would control the amplitude of pulses produced by impulse former 28. The novelty of discriminating stage 12 does not reside in the use of delta-modulation per se, but rather in the usage of a delta-modulation technique in order to detect changes in state of data transmission 10 rather than to encode it for subsequent re-transmission to a receiver.

Output signal 14, as mentioned above, contains a periodic component which is characteristic of the transmission clock signal contained in data transmission 10. However, other periodic components are also contained in output signal 14. In order to extract that periodic component of output signal 14 which in actuality corresponds with the transmission clock signal of data transmission 10, an interpreting stage 16 must be utilized in order to avoid other periodic components in output signal 14 from being utilized as transmission clock signals in subsequent data-processing equipment. To this end, a narrow bandpass filter 38 may be utilized. Bandpass filter 38 is tuned to the frequency of the transmission clock signal of data transmission 10. It will be recalled that this transmission clock signal is known in advance since it is used to produce data transmission 10 which is processed in discriminating stage 12. Bandpass filter 38 thus filters out all irrelevant components of output signal 14, and extracts a generally sinusoidal version of the transmission clock signal contained in data transmission 10. Sinusoidal output signal 40 produced by bandpass filter 38 is then routed to a threshold detector 42, which may take the form of a Schmitt trigger or the like. Threshold detector 42 can then produce a train of square waves having the frequency of the transmission clock signal contained in data transmission 10 and being in phase therewith. Thus, the transmission clock signal 18 produced by threshold detector 42 will have a frequency $F_T$ equal to the frequency of the transmission clock signal of data transmission 10.

As was mentioned above, data transmission 10 will contain a number of symbols equal to $2^N$, where N is the number of bits in the underlying data signal which is used as a modulating waveform for data transmission 10. In the event that this data signal contains only two symbols, N will be equal to 1 and thus transmission clock signal 18 will have a frequency $F_T$ equal to the frequency of the clock signal of the underlying data signal.

Figure 2:
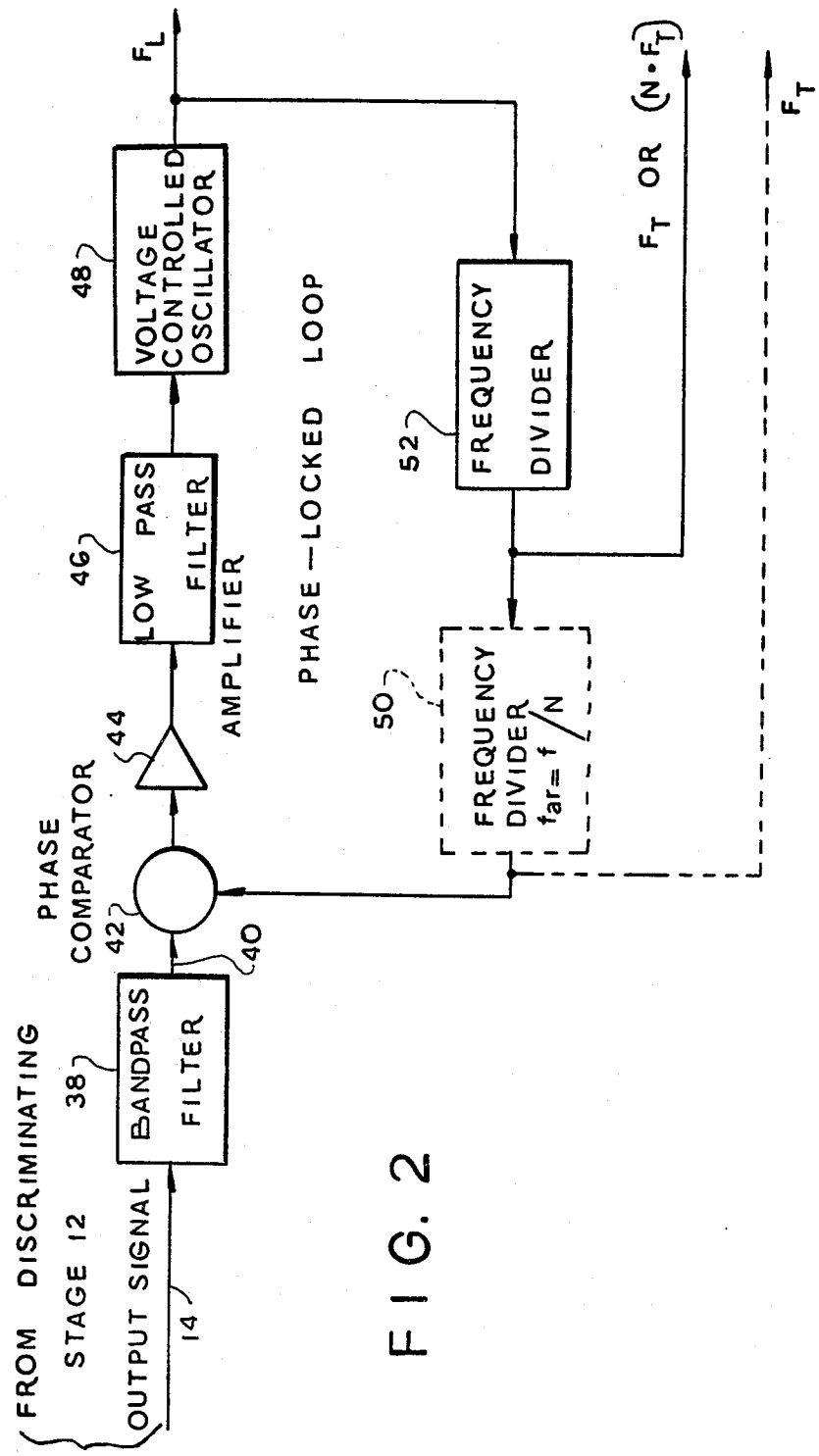
FIG. 2 is a block diagram of a portion of a second embodiment of the invention.

FIG. 2 shows a second embodiment of the invention in which a phase-locked loop is utilized in interpreting stage 16. A phase-locked loop of this type is disclosed, for example, in the magazine ELEKTRONIK, 1974, Book 11, pp. 425-428 and in Book 12, pp. 473-476. After bandpass filter 38, filtered sinusoidal output signal 40 is routed to a phase comparator 42.

Phase comparator 42 is the first component in the phase-locked loop used in this embodiment. The other components in this loop include amplifier 44, low-pass filter 46, voltage-controlled oscillator 48, and frequency divider 50. In an alternative embodiment, a second frequency divider 52 may also be utilized, as will be more fully explained hereinafter.

Voltage-controlled oscillator 48 produces a train of square wave pulses, which after division in frequency divider 50 are routed to phase comparator 42. Phase comparator 42 produces a voltage which represents the phase difference between the filtered output signal 40 and the pulse train produced by voltage-controlled oscillator 48. The output voltage produced by amplifier 44 is then routed through low-pass filter 46, and is thence passed to voltage-controlled oscillator 48. It is known to those skilled in the art that in systems of this type, phase comparator 42 will produce an output error signal which is proportional to the difference in phase between the signals appearing at its inputs. Thus, in a manner already known to those skilled in the art, the voltage driving voltage-controlled oscillator 48 will vary until equilibrium is established, which equilibrium will exist when the phase of the pulse train produced by voltage-controlled oscillator 46 is identical to the phase of filtered output signal 40. In this situation, frequency divider 50 is so selected that the signal produced at its output will have a frequency equal to $F_T$, the transmission clock signal of data transmission 10.

In an alternative embodiment shown by dashed lines in FIG. 3, voltage-controlled oscillator 48 may produce a signal with frequency $F_L$, namely the frequency of local clock 32. Then, frequency divider 50 is chosen so as to produce an output signal having a frequency equal to N multiplied by $F_T$, which, as noted above, is the actual rate of data transmission in data transmission 10. Then, an additional frequency divider 52 which divides by a factor of N can be added, in order to produce an output signal having a frequency of $F_T$, namely the transmission clock signal in data transmission 10. In a preferred embodiment of this invention, $F_L$ will be equal to 24 kHz, $F_T$ will be equal to 1600 Hz, N will equal 3, and the divisor utilized by frequency divider 50 will be equal to 5, producing an output signal equal to 4800 Hz.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an electronic circuit for extraction of a transmission clock signal from modulated data transmissions, comprising:
   a local clock producing a local clock pulse signal at a high frequency;
   a delta-modulation circuit responsive to the data modulated transmissions and the local clock pulse signals and producing a delta-modulated signal in response thereto;
   a shift register clocked by the clock and responsive to the delta-modulated signal to produce a data word in parallel form;
   a comparator connected to the shift register and operating in a manner that the comparator produces a logically high output signal when all bits are identical and producing a logically low output signal otherwise; and an interpreting stage responsive to periodicity of the output signals generated by the comparator and producing an extracted transmission clock signal having a periodicity equal to periodicity of the transmission clock signal and being in phase therewith.

2. The circuit defined in claim 1, wherein the interpreting stage includes an impulse former, whereby the extracted transmission clock signal is a train of square waves.

3. The circuit defined in claim 1, wherein the delta-modulated data signal is derived from a first bit in each parallel data word produced by the shift register.

4. The circuit defined in claims 1 or 3, wherein the interpreting stage includes a phase-locked loop responsive to periodicity of the output signals.

5. The circuit defined in claim 1, wherein the shift register is a 3-bit shift register.

* * * * *